United States Patent
Furuse

(10) Patent No.: US 6,847,137 B2
(45) Date of Patent: Jan. 25, 2005

(54) STATOR SUPPORT STRUCTURE FOR ELECTRIC ROTARY MACHINE

(75) Inventor: Hisayuki Furuse, Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/866,626

(22) Filed: May 30, 2001

(65) Prior Publication Data

US 2004/0213269 A1 Oct. 28, 2004

(30) Foreign Application Priority Data

Jun. 14, 2000 (JP) ..................................... P2000-178848
Jun. 14, 2000 (JP) ..................................... P2000-178851

(51) Int. Cl.[7] .............................................. H02K 9/00
(52) U.S. Cl. ........................................ 310/59; 310/58
(58) Field of Search ................................ 310/112, 216, 310/254, 52, 54, 114, 58, 59, 60 A

(56) References Cited

U.S. PATENT DOCUMENTS

| | | | | |
|---|---|---|---|---|
| 6,114,784 A | * | 9/2000 | Nakano | ...................... 310/113 |
| 6,211,597 B1 | * | 4/2001 | Nakano | ...................... 310/114 |
| 6,359,355 B1 | * | 3/2002 | Hartsfield et al. | .......... 310/254 |
| 6,369,483 B1 | * | 4/2002 | Hill | ............................ 310/216 |

FOREIGN PATENT DOCUMENTS

| | | | | |
|---|---|---|---|---|
| JP | 9-149566 A | 6/1997 | ............ | H02K/1/14 |
| JP | 11-275826 | 10/1999 | ............ | H02K/1/22 |
| JP | 11-275827 | 10/1999 | | |
| JP | 2000-14086 | 1/2000 | | |
| JP | 2000-14103 A | 1/2000 | .......... | H02K/16/02 |
| JP | 2000-014086 | 1/2000 | | |
| JP | 2001-169483 A | 6/2001 | ............ | H02K/1/18 |
| JP | 2003-299271 A | 10/2003 | ............ | H02K/1/18 |

OTHER PUBLICATIONS

Patent Abstracts of Japan, vol. 2000, No. 03, JP 11–341757, Dec. 10, 1999.

* cited by examiner

Primary Examiner—Dang Le
Assistant Examiner—Hanh Nguyen
(74) Attorney, Agent, or Firm—Foley & Lardner LLP

(57) ABSTRACT

A stator support structure is constructed having a divided-coil type stator 5 having a plurality of divided stator cores 5A and a plurality of stator coils wound around the stator cores, respectively. First and second rotors 7 and 9 are located inside and outside the stator 5, respectively, to form a three-layer structure. The stator cores 5A are fixedly supported at both distal ends thereof with front and rear stator support members, respectively, with equally spaced distances. A plurality of elongated positioning projection members 31 are located between the stator cores 5A. Further, provision of the stator support members 19 and 21 made of a material having nonmagnetic and high heat conducting properties allows the stator support members 19 and 21 to discharge heat from the stator 5.

21 Claims, 7 Drawing Sheets

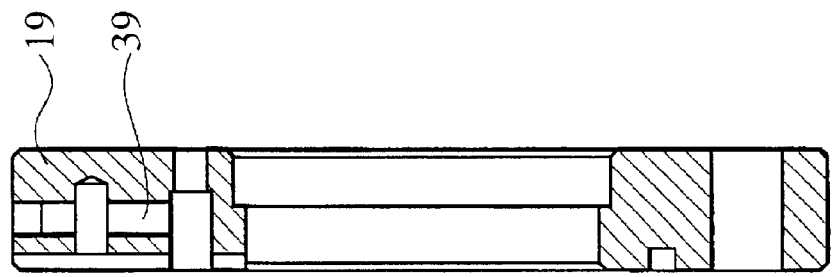
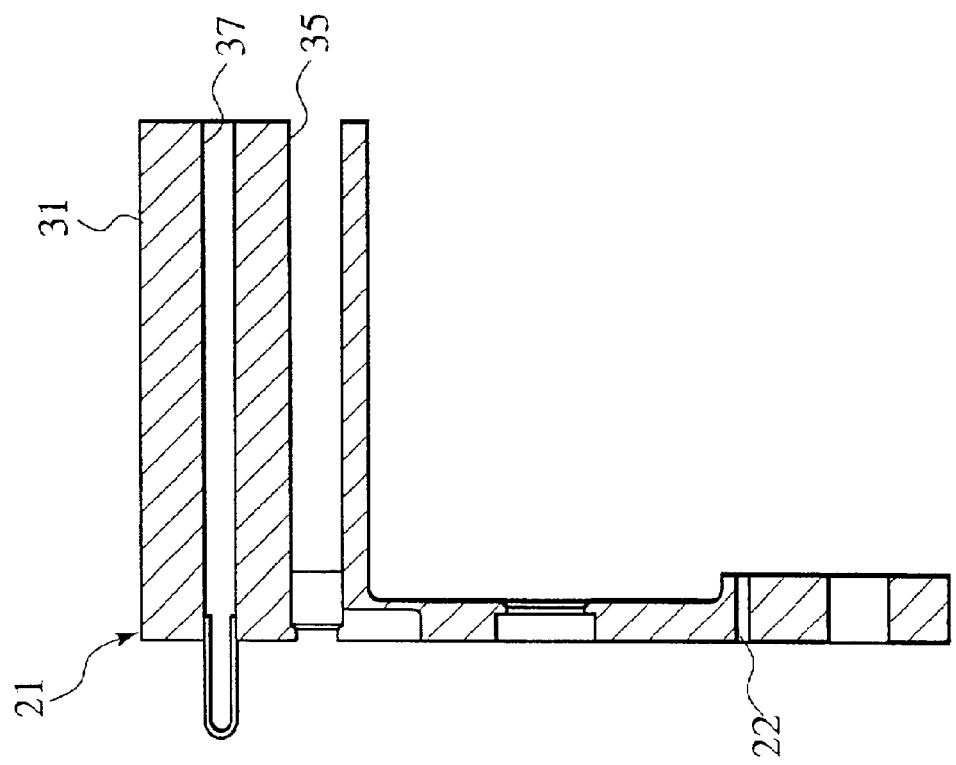

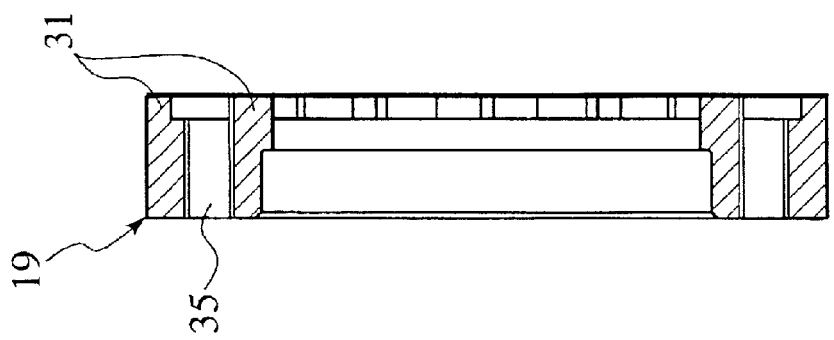
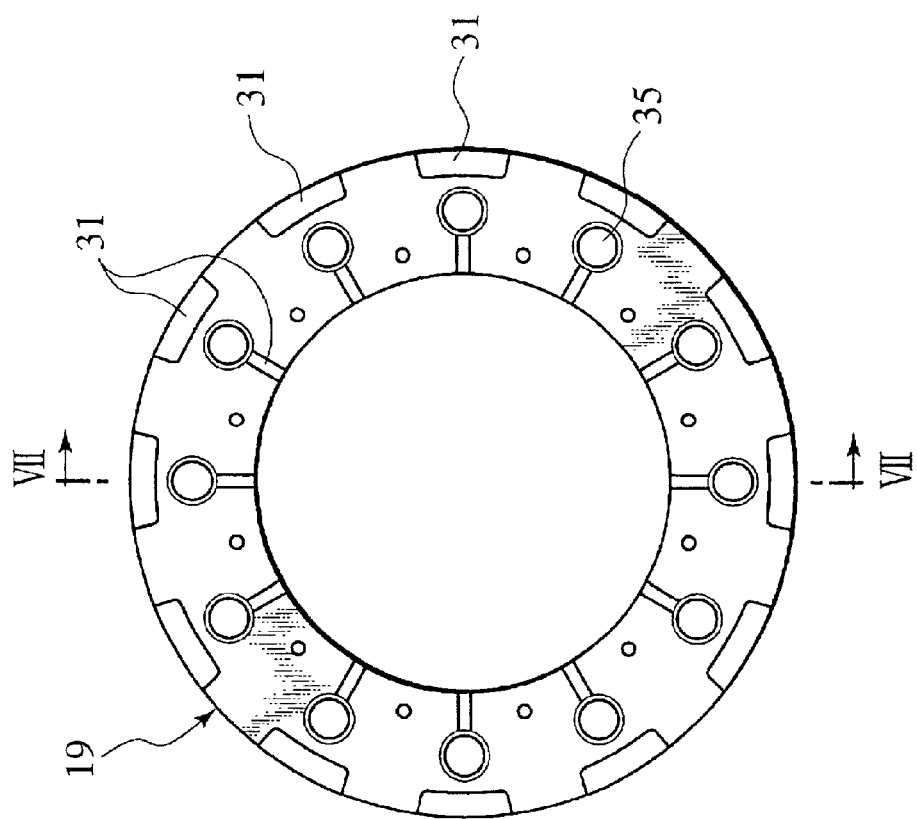

STATOR SUPPORT STRUCTURE FOR ELECTRIC ROTARY MACHINE

BACKGROUND OF THE INVENTION

This invention relates to stator support structures for electric rotary machines and, more particularly, to a stator support structure having a divided-coil type stator which includes a plurality of divided stator cores and a plurality of stator coils wound around the stator cores, respectively, to form a three-layer structure wherein a first rotor is rotatably located inside the stator and a second rotor is rotatably located outside the stator in a concentric relationship.

An electric rotary machine, wherein a single stator is arranged to allow two rotors to rotate, is disclosed in Japanese Patent Provisional Publication No. 11-275826.

SUMMARY OF THE INVENTION

An electric rotary machine includes a three-layer structure with a view to providing a compact structure. However, the electric machine of this type is encountered with several inadequacies. Firstly, a stator must have inner and outer peripheries formed with alternately arranged magnetic flux patterns of S and N poles thereon which face first and second rotors, respectively. To this end, the stator is divided into a plurality of stator cores which are supported with a given angular distance. In this event, the stator is located between the first and second rotors such that, in order to correctly control the flow of magnetic flux, the adjacent stator cores must be properly managed in the given angular distance, resulting in a complicated support structure for the stator.

Secondly, since the stator, which is a source of generating heat, is located between the first and second rotors in a sandwiched structure and both- sides of the stator are surrounded with a casing, heat is liable to be accumulated in the stator, resulting in a lowered cooling efficiency.

The present invention has been made to overcome the above mentioned two inadequacies and has an object to provide a stator support structure for an electric rotary machine which allows stator cores to be rigidly and correctly supported with a given angular spacing without causing any complicated structure while permitting heat, generated in a stator, to be efficiently dissipated outward.

According to a first aspect of the present invention, there is provided a stator support structure for an electric rotary machine, which stator support structure comprises a divided-coil type stator including a plurality of divided stator cores and a plurality of stator coils wound around the stator cores, respectively, a first rotor disposed inside the divided-coil type stator, a second rotor disposed outside the divided-coil type stator, a first stator support member supporting one side of the divided-coil type stator and a second stator support member supporting the other side of the divided-coil type stator. The divided-coil type stator, the first and second rotors are rotatably disposed in a concentric relationship to form a three-layer structure, and both distal ends of the respective stator cores are rigidly supported with the first and second stator support members with a given equal distance.

In a preferred embodiment, the first and second stator support members of the stator support structure are made of a material having nonmagnetic and high heat conducting properties.

According to a second aspect of the present invention, there is provided a stator support structure for an electric rotary machine, which stator support structure comprises a divided-coil type stator including a plurality of divided stator cores and a plurality of stator coils wound around the stator cores, respectively, a first rotor disposed inside the divided-coil type stator, a second rotor disposed outside the divided-coil type stator, first stator support means for supporting one side of the divided-coil type stator, and second stator support means for supporting the other side of the divided-coil type stator. The divided-coil type stator, the first and second rotors are rotatably disposed in a concentric relationship to form a three-layer structure, and both distal ends of the respective stator cores are rigidly supported with the first and second stator support means with a given equal distance.

In a preferred embodiment, the first and second stator support members of the stator support structure are made of a material having nonmagnetic and high heat conducting properties.

BRIEF DESCRIPTION OF THE DRAWINGS

The invention, together with objects and advantages thereof, may best be understood by reference to the following description of the presently preferred embodiments together with the accompanying drawings in which:

FIG. 4 is a cross sectional view taken along line IV—IV of FIG. 3;

FIG. 5 is a cross sectional view of a front stator support member similar to FIG. 4;

FIG. 6 is a schematic view of a front stator support member illustrating an example wherein positioning projection members are shortened;

FIG. 7 is a cross sectional view taken along line VII—VII of FIG. 6;

DETAILED DESCRIPTION OF THE PREFERRED EMBODIMENTS

A preferred embodiment of a stator support structure for an electric rotary machine according to the present invention will be explained below with reference to FIGS. 1 to 5.

Figure 1:
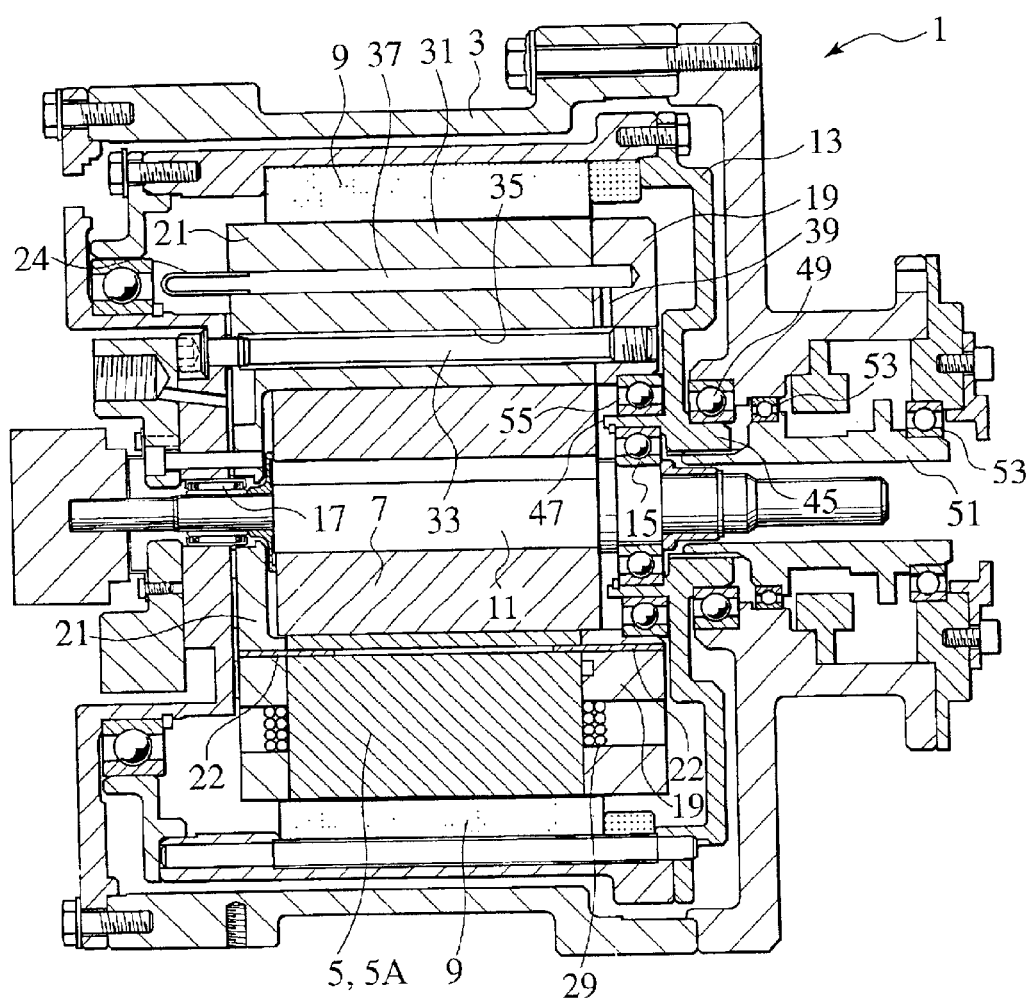
FIG. 1 is a schematic cross sectional view of an electric rotary machine employing a preferred embodiment of a stator support structure according the present invention.

FIG. 1 schematically shows a sectional view of an electric rotary machine according to the present invention. The electric rotary machine 1 has a casing 3, in which a stator core 5, and first and second rotors 7 and 9 are located. The first rotor 7 is disposed inside the stator 5 and the second rotor 9 is disposed outside the stator 5, with the stator 5, the first and second rotors 7 and 9 being located in a concentric relationship to form a three-layer structure.

The first rotor 7 is mounted to a first rotatable shaft 11 that is located at the center of the casing 3. The first rotatable shaft 11 is rotatably supported at one end with a front rotor case bearing 15 which is mounted to a rotor casing 13 (described later) and at the other end by a rear case bearing 17 such as a needle bearing, which is mounted in the casing 3.

Figure 2:
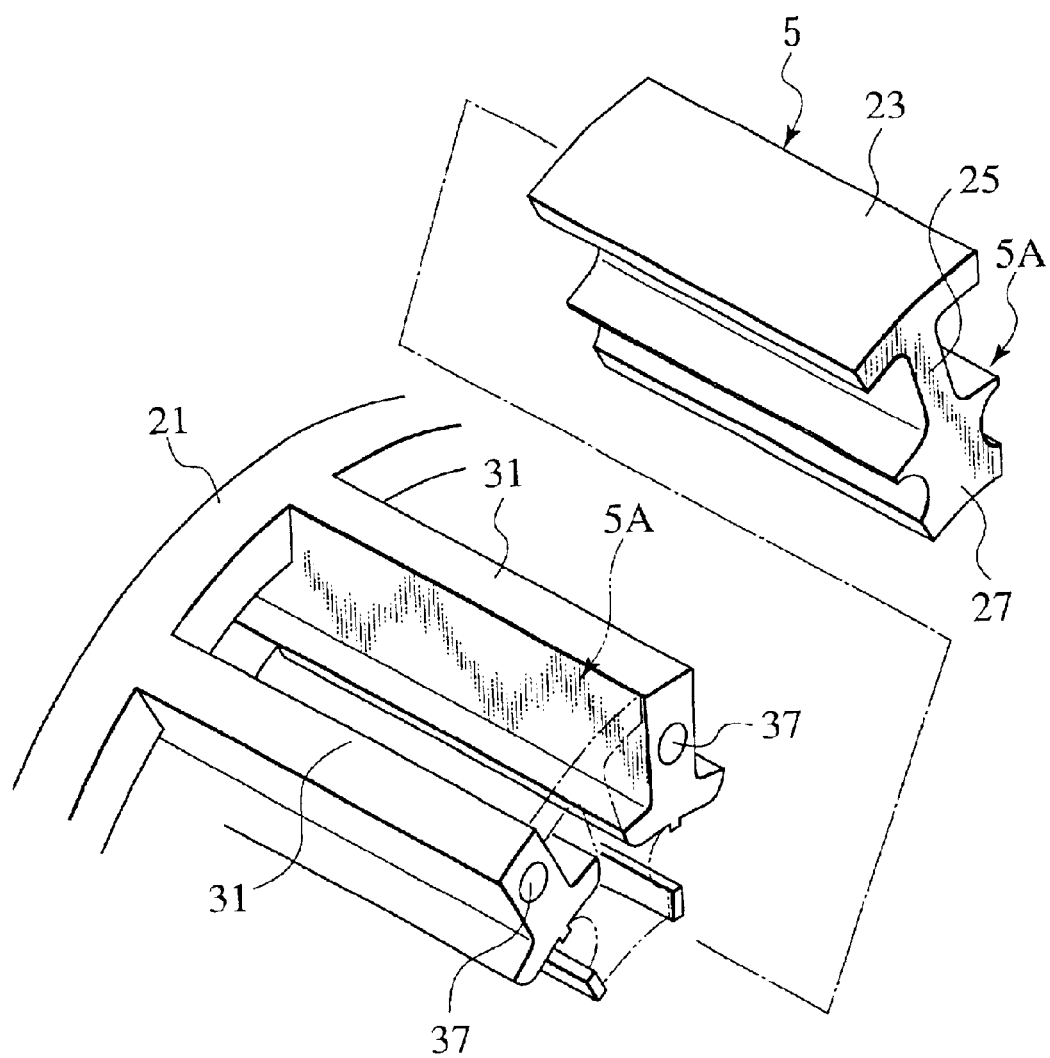
FIG. 2 is an exploded perspective view of a positioning projection member and stator cores associated therewith, certain parts being cutaway fro clarity.
Figure 3:
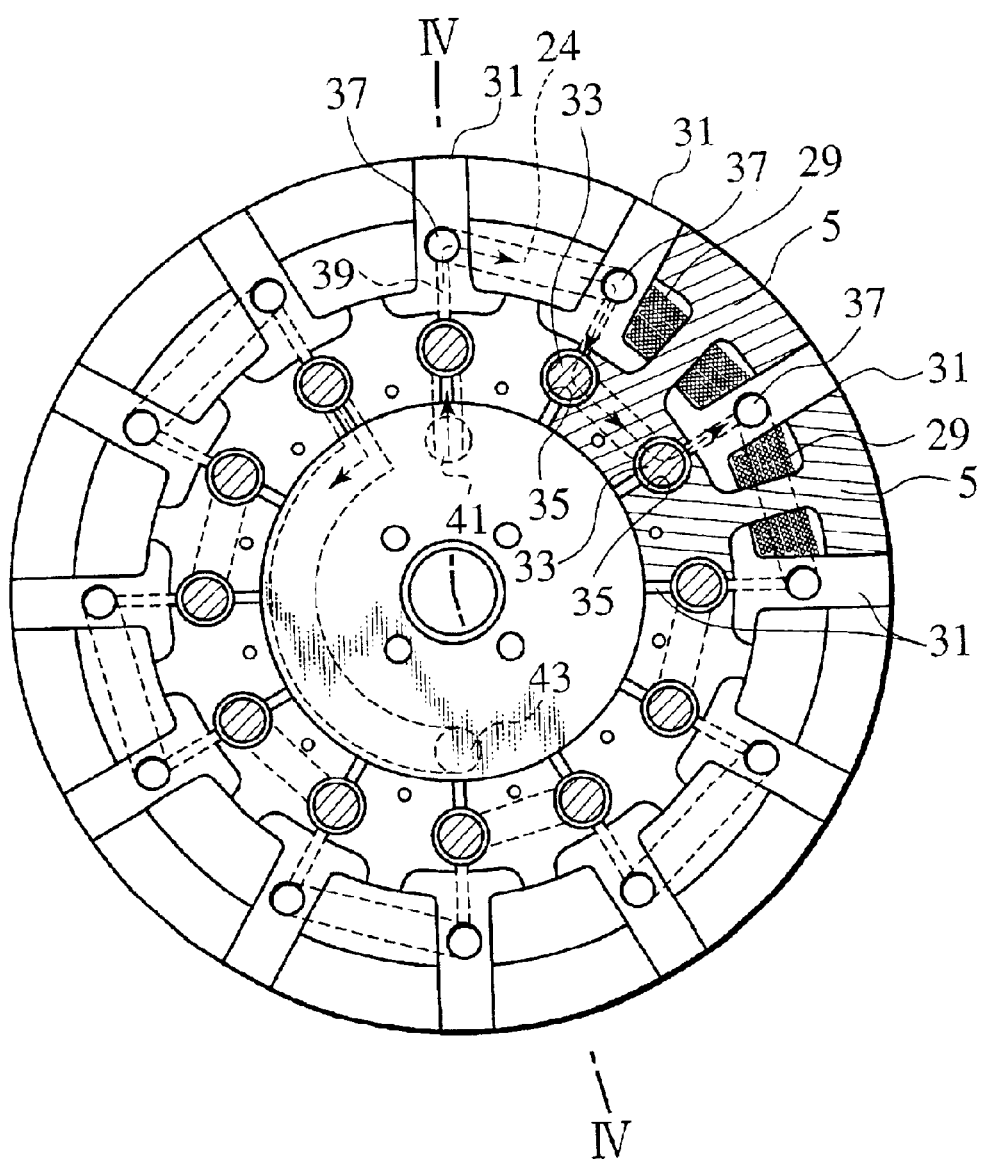
FIG. 3 is a view for illustrating certain stator cores and a rear support member associated therewith.

As shown in FIGS. 2 and 3, the stator 5 is constructed of a divided-coil type stator which includes a plurality of divided stator cores 5A which are spaced from one another with a given angular spacing. As seen in FIG. 1, one end of the stator core 5A is fixedly supported with a front stator support member 19 and the other end of the stator core 5A is fixedly supported by a rear stator support member 21, with the stator core 5A and the first and second stator support members 19 and 21 being fixed to one another with a fixing pin 22 to provide a unitary structure.

As shown in FIG. 2, each of the stator cores 5A is composed of a head portion 23, a body portion 25 and a bottom portion 27, with the body portion 25 carrying thereon a stator coil 29 (see FIG. 1).

A plurality of elongated positioning projection members 31 are formed integral with and axially extend from the rear stator support member 21 toward the front stator support member 19 between the stator cores 5A. With such a structure, the positioning projection members 31 function to allow the stator cores 5A to be correctly separated from one another with a given angular spacing to permit thermal energy to be rapidly transferred to the front and rear stator support members 19 and 21.

The front and rear stator support members 19 and 21 are made of a material having nonmagnetic and high thermal conducting properties, such as aluminum etc. The head portion 23, a part of the body portion 25 and the bottom portion 27 of the stator core 5A are press fitted between the adjacent positioning projection members 31 in tight engagement. With this arrangement, the positioning projection members 31 and the stator cores 5A associated therewith are held in tight contact with the lengths of the components, enhancing increased surface areas for dissipating heat. Further, both ends of each stator core 5A are held in tight contact with the front and rear stator support members 19 and 21, and each stator coil 29 is also held in tight contact with the adjacent positioning projection members 31 and the front and rear stator support members 19 and 21, thereby allowing heat generated by the stator 5 and the stator coil 29, to be smoothly transferred to the positioning projection members 31 and the front and rear stator support members 19 ad 21.

The stator 5 is fixedly supported with the front and rear stator support members 19 and 21 by means of a plurality of fixing bolts 33 that axially extend from a rear side wall of the casing 3.

The stator support members 19 and 21 have axially extending through-bores that receive the fixing bolts 33, respectively. Likewise, a through-bore is axially formed in the base portion 27 of each stator core 5A. The through-bores of the stator support members 19 and 21 and the stator cores 5A are treated with a sealing material such as synthetic resin in the form of a continuous sleeve while forming elongated coolant flow passages 35 on outer peripheries of respective fixing bolts 33 to allow cooling medium to flow. With such a structure, there is no need to form specific fluid passages to pass the cooling medium and efficient heat exchange can be obtained, thereby allowing heat, generated in the stator cores, to be effectively dissipated.

The coolant flow passages 35 communicate with one another through elongated axial bores 37 and radially extending connecting flow passages 39 of the positioning projection members 31. As viewed in FIG. 3, a coolant supply port 41 allows the coolant medium to flow through the coolant flow passage 35, which is located radially inward, into the elongated axial bore 37, which is located radially outward, from which the coolant medium then flows through a U-shaped tube 24 into the elongated axial bore 37 adjacent to the preceding axial bore 37. Subsequently, the coolant medium flows radially inward through the radially extending connecting flow passages 39 into the coolant flow passage 35, which located radially inward. Thus, the coolant medium flows through a circumferentially extending flow passage (with no reference numeral) into the adjacent coolant flow passage 35 from which the coolant medium is further delivered to the elongated axial bore 37. In this manner, the coolant medium is delivered through the plural coolant flow passages 35, the plural connecting flow passages 39, the U-shaped tubes 24 and the circumferentially extending flow passages in a repeated sequence into a final outlet 43. As a consequence, heat generated by the stator coil 29 is effectively cooled with the coolant medium and, therefore, heat is not accumulated in the internal parts of the rotary machine. Accordingly, heat exchange is carried out in high thermal conductivity with the coolant medium flowing throughout the whole areas of the stator support member and the positioning projection members, resulting in efficient cooling of the stator.

Figure 9:
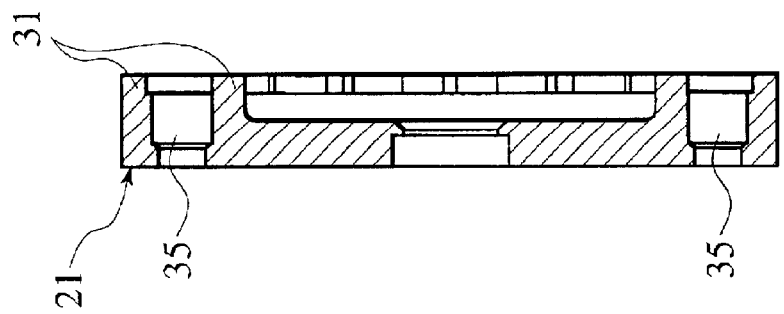
FIG. 9 is a cross sectional view taken along line IX—IX of FIG. 8.
Figure 8:
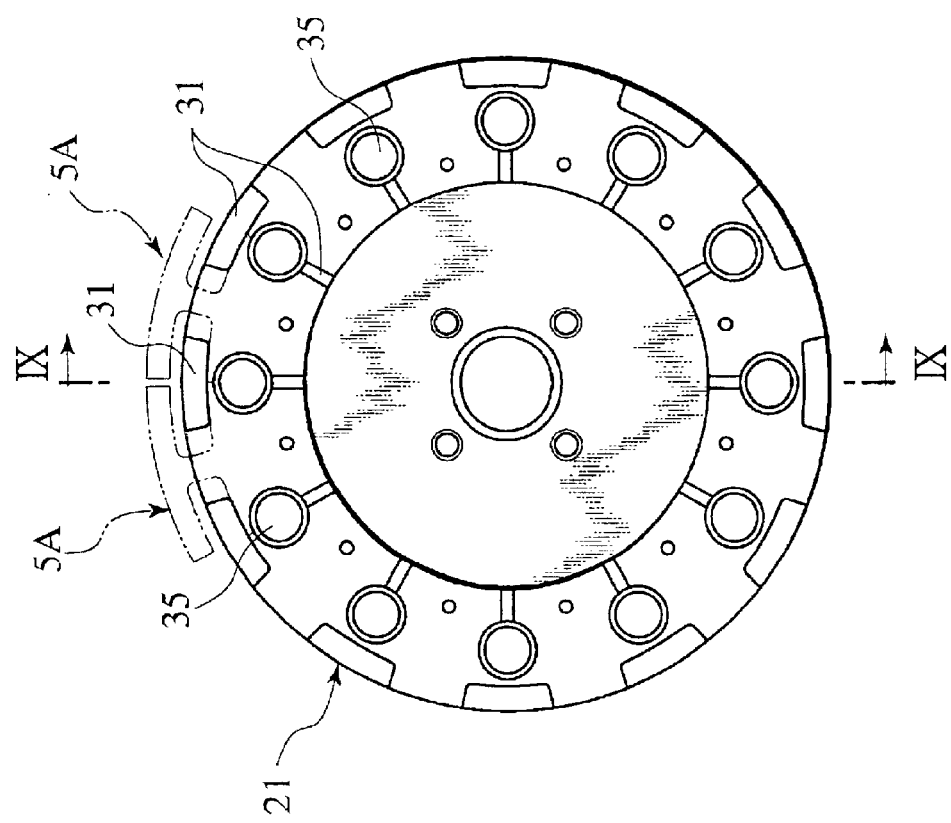
FIG. 8 is a schematic view of a rear stator support member illustrating an example wherein positioning projection members are shortened.

Further, each of the positioning projection members 31 may be formed in a short length so as to face the front stator support member 19 as shown in FIGS. 6 and 7 and to face the rear stator support member 21 as shown in FIGS. 8 and 9.

Also, each of the positioning members 31 may be formed of a material independently of the rear-stator support member 21.

Figure 10:
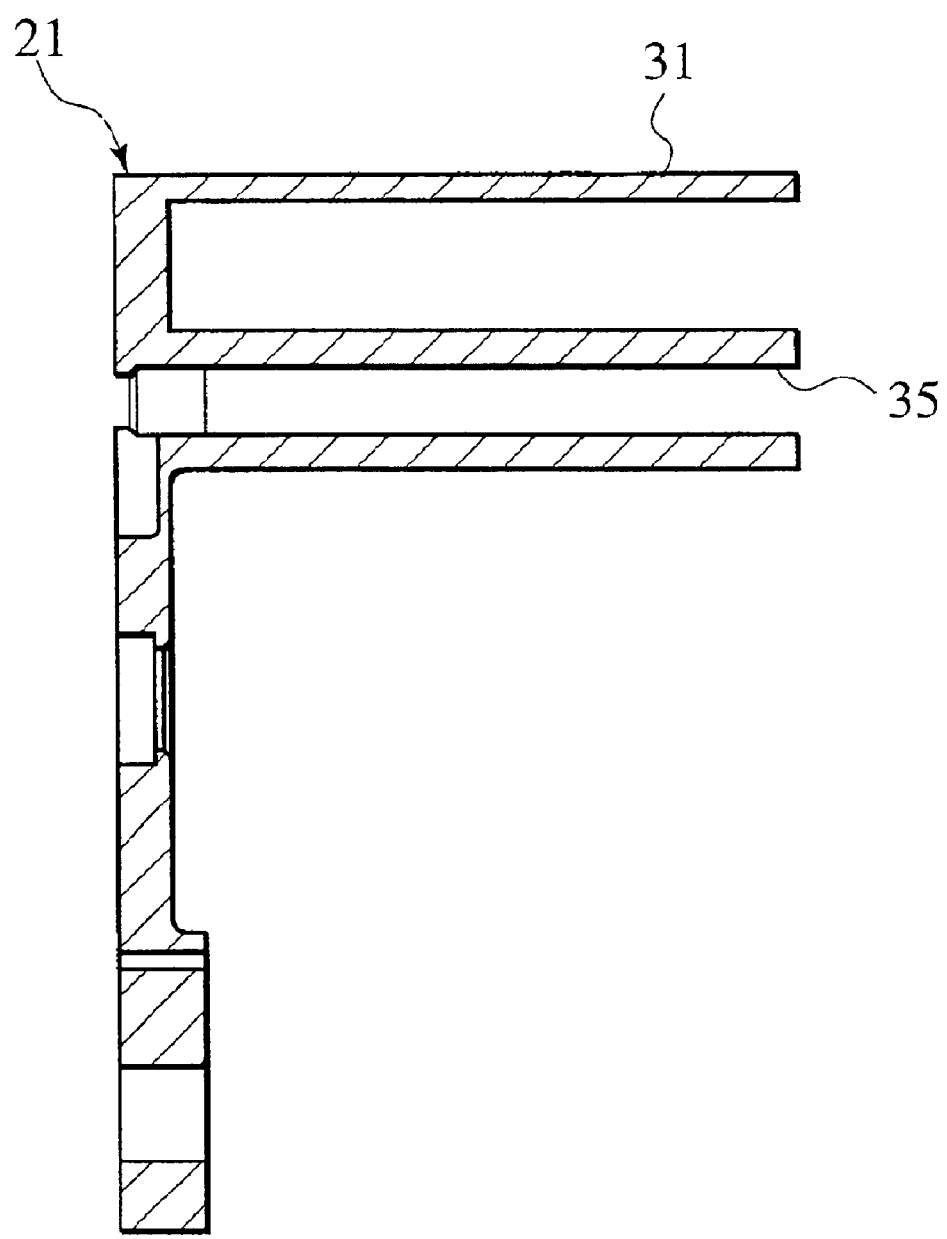
FIG. 10 is a cross sectional view, which is similar to FIG. 4, and showing a structure wherein flow passages are omitted in respective positioning projection members.

Moreover, as seen in FIG. 10, the positioning projection member 31 may have a configuration wherein the elongated axial bore 37 is dispensed with.

The second rotor 9 is mounted to an inner side of a rotor casing 13 which is located inside the casing 3.

The rotor casing 13 includes an outer bearing support 45 and an inner bearing support 47, and the outer bearing support 45 is rotatably supported with a front case bearing 49 that is secured to the casing 3. The outer bearing support 45 is coupled to a second rotatable shaft 51, with a spline connection, which is rotatably supported with a pair of bearings 53 mounted to the casing 3.

The second rotatable shaft 51 includes a hollow shaft through which a front distal end of the first rotatable shaft 11 extends, forming a double-shaft structure.

The inner bearing support 47 is rotatably supported at its outer periphery with a front stator bearing 55 mounted to the front stator support member 19, and is also rotatably supported at its inner periphery with the front case bearing 15.

Thus, the rotation of the rotor case 13 with the second rotor 9 allows the second rotatable shaft 51 to be rotatable in a unitary structure.

The stator coil 29 of the stator 5 is supplied with composite current drive signals from a control unit (not shown) to generate the same number of rotating magnetic flux fields as that of the first and second rotors 7 and 9.

With such a structure of the electric rotary machine 1, supply of the composite current drive signals to the stator coil 29 allows the first and second rotors 7 and 9 to serve as an electric power generator. In this event, the positioning projection members 31 serve as heat transfer means such that heat generated by the stator cores 5A and the stator coils 29 is rapidly transferred to the front and rear stator support members 19 and 21 via the positioning projection members 31, or directly transferred to the stator support members 19 and 21 to be dissipated. At this moment, each stator core 5A is held in rigidly supported condition between the front and rear stator support members 19 and 21. Also, the stator cores 5A are angularly spaced from one another with the given distance by the associated positioning projection member 31, enhancing an increased precision in clearance between the respective stator cores 5A. As a result, the flows of magnetic flux can be accurately controlled. Further, each of the positioning projection members has a length extending between the front and rear stator support members, resulting in a remarkably increased precision in clearance between the adjacent stator cores and an increased and reliably rigid structure throughout the whole region of the stator cores. Moreover, the stator core is press fitted between the positioning projection members, ad a resulting rigidly supported condition is obtained without causing any plays. In addition, since the stator core is supported with the front and rear stator support members in a unitary structure by means of a plurality of fixing pins, the front and rear stator support members and the associated stator cores are coupled to one another with the fixing pins in respective, reliably positioned states.

Further, since the stator cores 5A and the stator coils 29 are mutually held in tight contact with the positioning projection members 31 and the respective stator support members 19 and 21 over a wide area, efficient heat transfer is obtained to discharge heat from the stator support members 19 and 21.

Also, heat generated in the stator cores 5A is heat exchanged with the coolant medium flowing through the inner portions of the respective stator cores 5A, and is cooled thereby.

Further, the stator support members 19 and 21, which are made of material having high thermal conductivity, have an improved heat discharging characteristic while allowing internal heat in the stator support members to be dissipated outward, with a resultant remarkable improvement in cooling efficiency.

The entire content of Japanese Application Nos. P2000-178848 and P2000-178851 with a filing date of Jun. 14, 2000 is herein incorporated by reference.

Although the invention has been described above by reference to certain embodiments of the invention, the invention is not limited to the embodiments described above will occur to those skilled in the art, in light of the teachings. The scope of the invention is defined with reference to the following claims.

What is claimed is:

1. A stator support structure for an electric rotary machine, comprising:
   a divided-coil type stator including a plurality of divided stator cores and a plurality of stator coils wound around the stator cores, respectively;
   a first rotor disposed inside the divided-coil type stator;
   a second rotor disposed outside the divided-coil type stator;
   a first stator support member supporting one side of the divided-coil type stator;
   a second stator support member supporting the other side of the divided-coil type stator; and
   a plurality of positioning projection members which are located between the first and second stator support members,
   wherein the divided-coil type stator and the first and second rotors are rotatably disposed in a concentric relationship to form a three-layer structure, and both distal ends of the respective stator cores are rigidly supported with the first and second stator support members with a given equal distance,
   wherein each of the positioning projection members remains between adjacent stator cores to allow the stator cores to be positioned with the given equal distance, and
   wherein each of the positioning position members is monolithically integral with one of the stator support members.

2. A stator support structure for an electric rotary machine according to claim 1, wherein each of the positioning projection members has a length extending between the first and second stator support members.

3. A stator support structure for an electric rotary machine according to claim 1, wherein each of the divided stator cores is press fitted between the adjacent positioning projection members.

4. A stator support structure for an electric rotary machine according to claim 1, wherein the stator cores are integrally supported with and coupled to the first and second stator support members by a plurality of fixing pins.

5. A stator support structure for an electric rotary machine according to claim 1, wherein the first and second stator support members are made of a material having nonmagnetic and high heat conducting properties.

6. A stator support structure for an electric rotary machine according to claim 1, wherein each of the first and second stator support members has a flow passage for passing coolant medium.

7. A stator support structure for an electric rotary machine according to claim 1,
   wherein the first and second stator support members and the positioning projection members have flow passages to allow coolant medium to flow, and
   wherein the flow passages pass through an interior of the positioning projection members in a longitudinal direction of the positioning projection members.

8. A stator support structure for an electric rotary machine according to claim 1, wherein each of the stator coils is held in tight contact with adjacent surfaces of the first and second stator support members and the adjacent positioning projection members.

9. A stator support structure for an electric rotary machine according to claim 1, wherein each of the stator cores has a flow passage formed around fixing bolts for fixing the stator cores, each of the stator cores being treated with a sealing material to form the flow passages for passing a coolant medium.

10. A stator support structure for an electric rotary machine according to claim 1, wherein each of the stator cores is held in tight contact with the first and second stator support members and the positioning projection members.

11. A stator support structure for an electric rotary machine according to claim 1, wherein each of the positioning projection members is held in tight contact with the adjacent stator cores along a longitudinal direction of the positioning projection members.

12. A stator support structure for an electric rotary machine, comprising:
- a divided-coil type stator including a plurality of divided stator cores and a plurality of stator coils wound around the stator cores, respectively;
- a first rotor disposed inside the divided-coil type stator;
- a second rotor disposed outside the divided-coil type stator;
- first stator support means for supporting one side of the divided-coil type stator;
- second stator support means for supporting the other side of the divided-coil type stator; and
- a plurality of positioning projection means which are located between the first and second stator support means,
- wherein the divided-coil type stator and the first and second rotors are rotatably disposed in a concentric relationship to form a three-layer structure, and both distal ends of the respective stator cores are rigidly supported with the first and second stator support means with a given equal distance,
- wher in each of the positioning projection means remains between adjacent stator cores to allow the stator cores to be positioned with the given equal distance, and
- wherein each of the positioning projection means is monolithically integral with one of the stator support means.

13. A stator support structure for an electric rotary machine, comprising:
- a divided-coil type stator including a plurality of divided stator cores and a plurality of stator coils wound around the stator cores, respectively;
- a first rotor disposed inside the divided-coil type stator;
- a second rotor disposed outside the divided-coil type stator;
- a first stator support member supporting one side of the divided-coil type stator;
- a second stator support member supporting the other side of the divided-coil type stator; and
- a plurality of positioning projection members which are located between the first and second stator support members,
- wherein the divided-coil type stator and the first and second rotors are rotatably disposed in a concentric relationship to form a three-layer structure, and both distal ends of the respective stator cores are rigidly supported with the first and second stator support members with a given equal distance,
- wherein each of the positioning projection members remains between adjacent stator cores to allow the stator cores to be positioned with the given equal distance, and
- wherein each of the positioning projection members is in contact with one of the plurality of divided stator cores.

14. A stator support structure for an electric rotary machine according to claim 13, wherein each of the positioning projection members has a length extending between the first and second stator support members.

15. A stator support structure for an electric rotary machine according to claim 13, wherein each of the divided stator cores is press fitted between the adjacent positioning projection members.

16. A stator support structure for an electric rotary machine according to claim 13, wherein the stator cores are integrally supported with and coupled to the first and second stator support members by a plurality of fixing pins.

17. A stator support structure for an electric rotary machine according to claim 13, wherein the first and second stator support members are made of a material having nonmagnetic and high heat conducting properties.

18. A stator support structure for an electric rotary machine according to claim 13, wherein each of the first and second stator support members has a flow passage for passing coolant medium.

19. A stator support structure for an electric rotary machine according to claim 13,
- wherein the first and second stator support members and the positioning projection members have flow passages to allow coolant medium to flow, and
- wherein the flow passages pass through an interior of the positioning projection members in a longitudinal direction of the positioning projection members.

20. A stator support structure for an electric rotary machine according to claim 13, wherein each of the stator coils is held in tight contact with adjacent surfaces of the first and second stator support members and the adjacent positioning projection members.

21. A stator support structure for an electric rotary machine according to claim 13, wherein each of the stator cores has a flow passage formed around fixing bolts for fixing the stator cores, each of the stator cores being treated with a sealing material to form the flow passages for passing a coolant medium.

* * * * *